Dec. 24, 1968  R. D. RUMSEY  3,417,806
ROTARY ACTUATOR ASSEMBLIES FOR RESTRICTED DIAMETER USES
Filed July 10, 1963  5 Sheets-Sheet 1
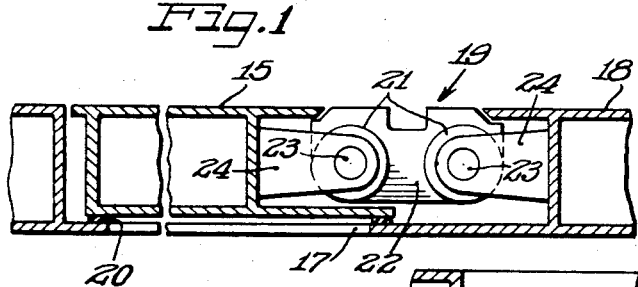
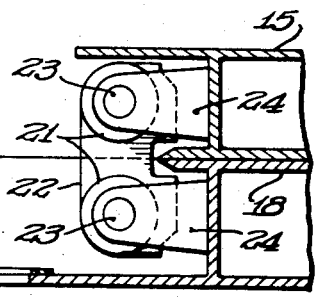
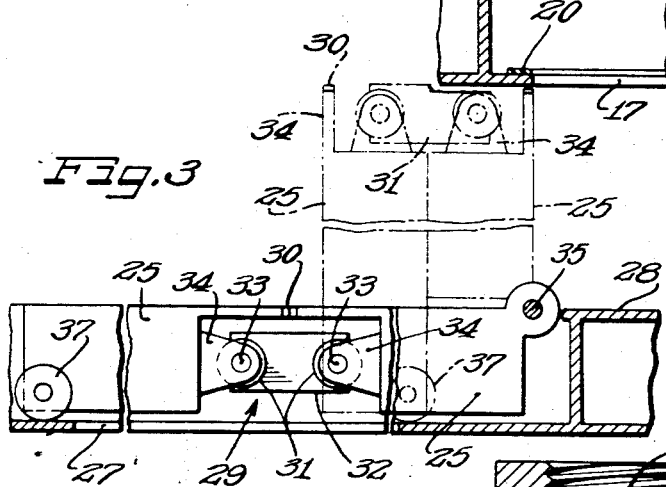
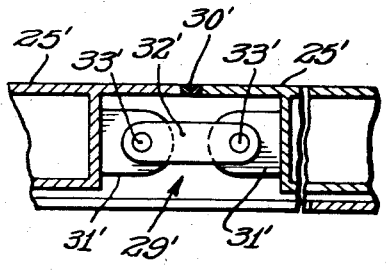
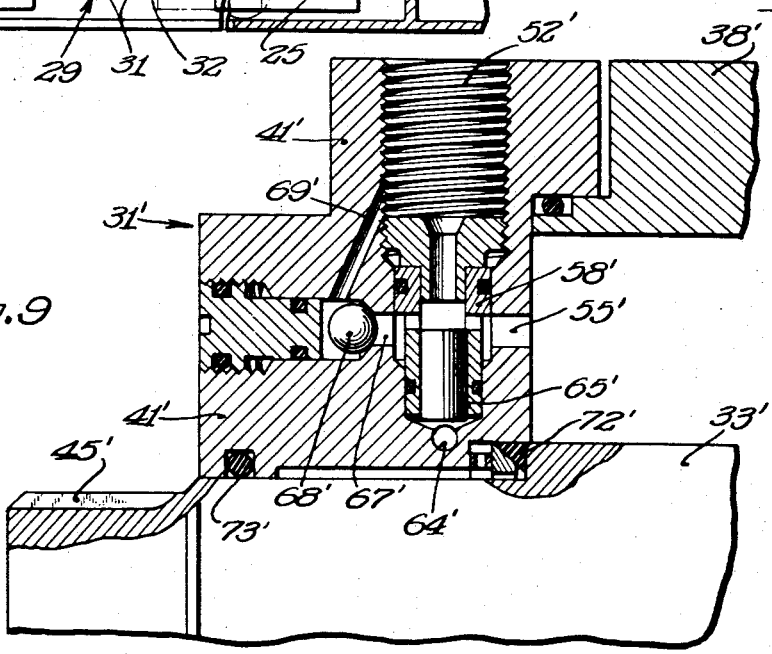
INVENTOR.
Rollin Douglas Rumsey
BY
ATTORNEYS

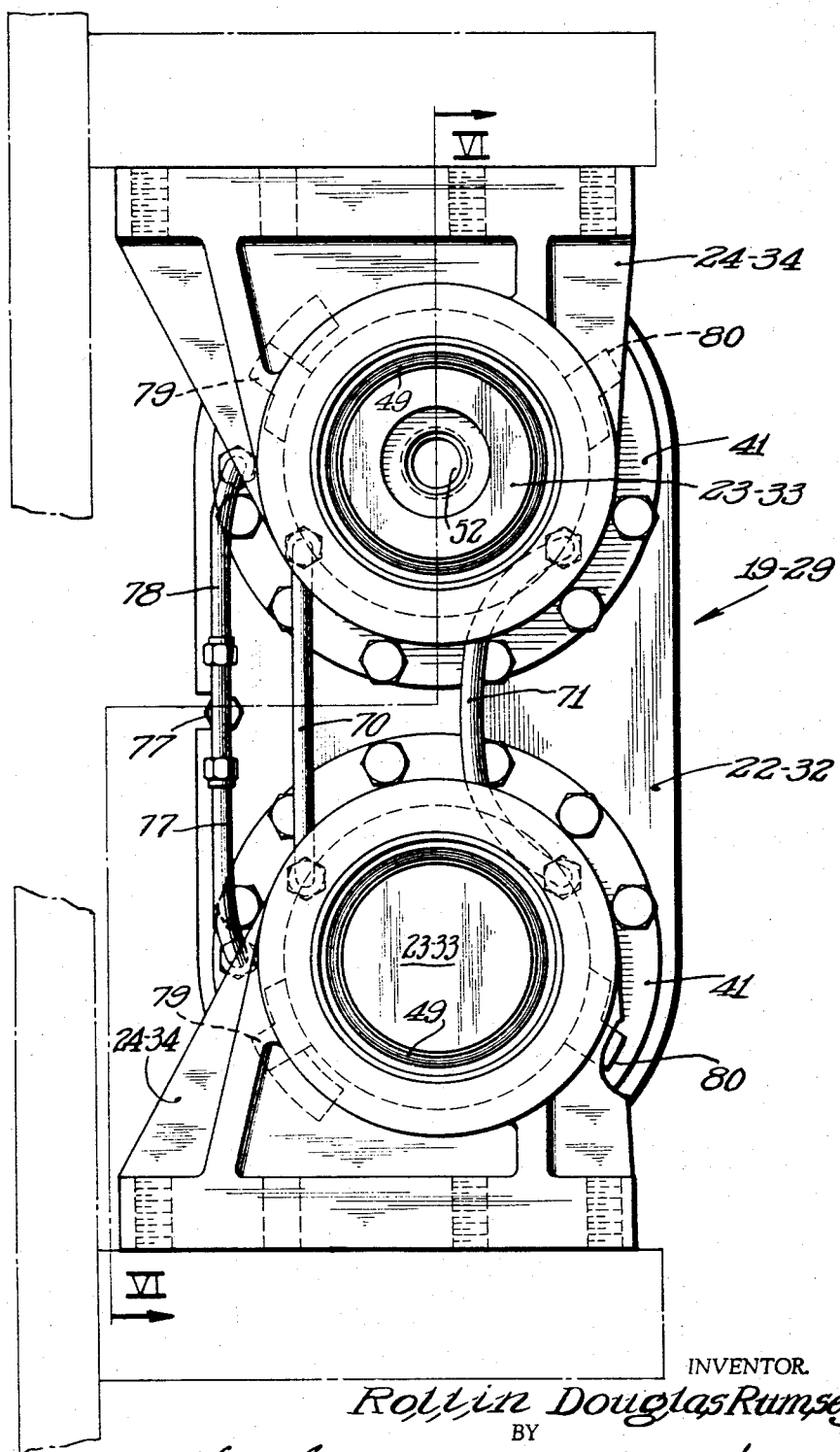

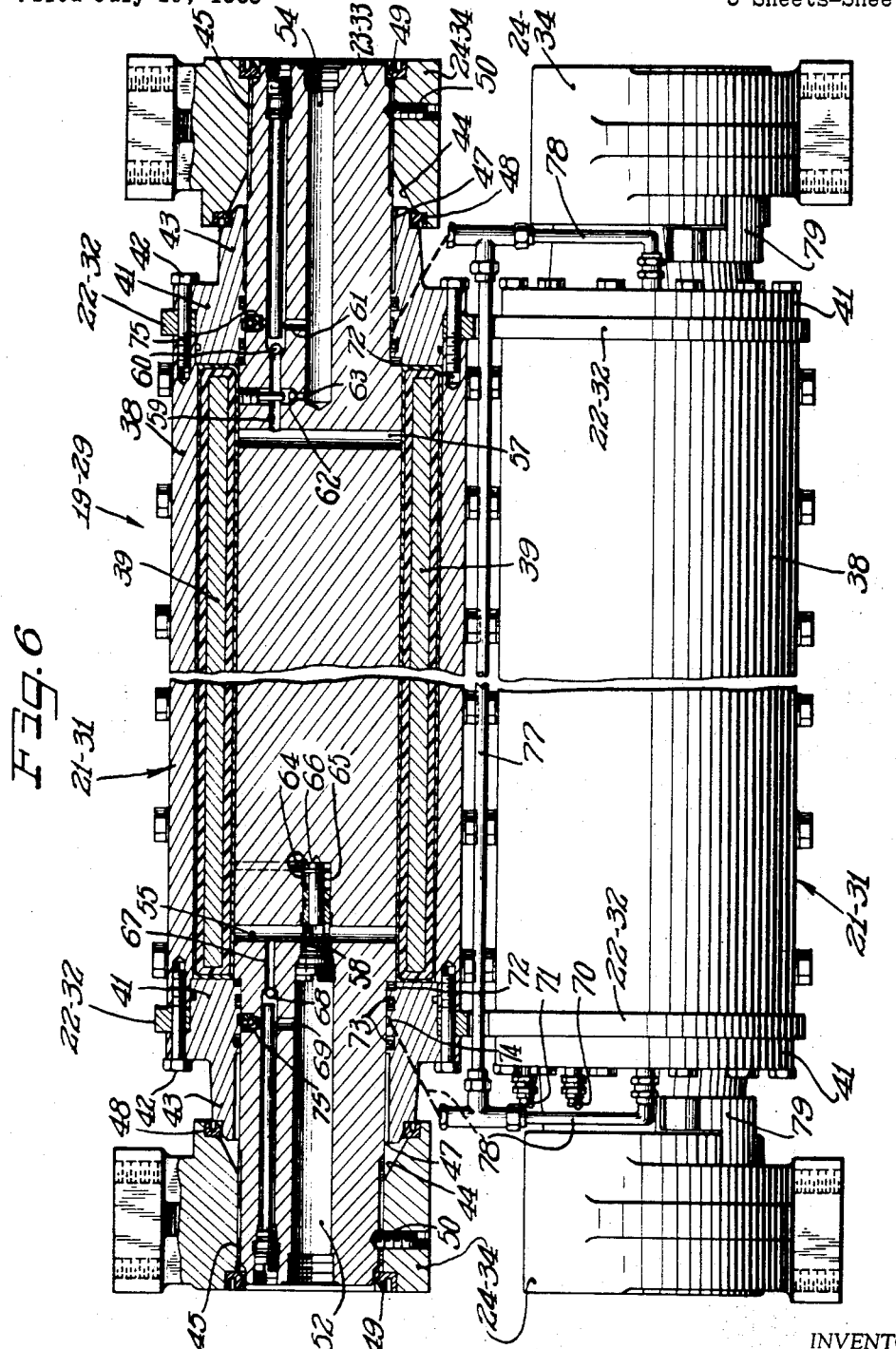

Dec. 24, 1968  R. D. RUMSEY  3,417,806
ROTARY ACTUATOR ASSEMBLIES FOR RESTRICTED DIAMETER USES
Filed July 10, 1963  5 Sheets-Sheet 4
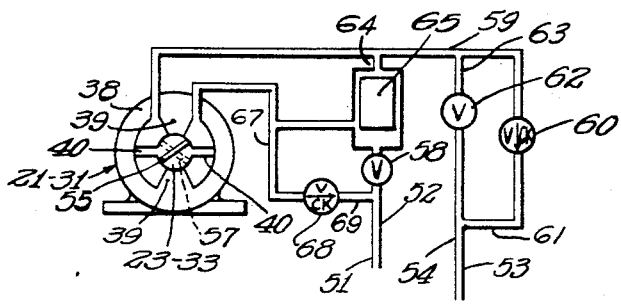
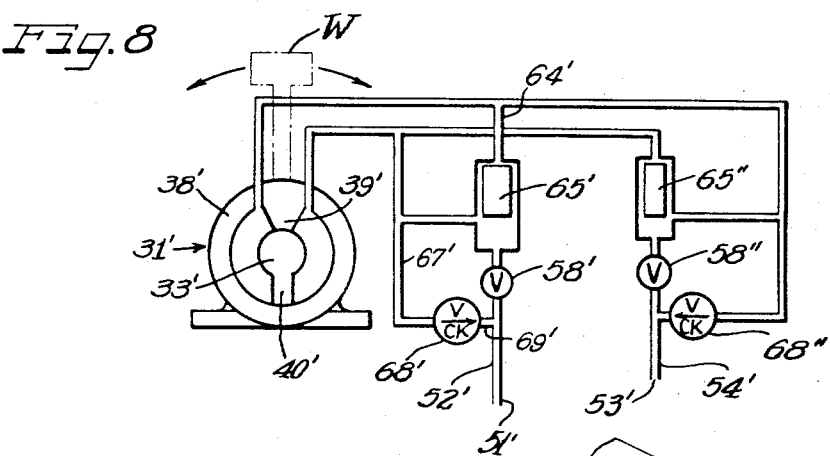
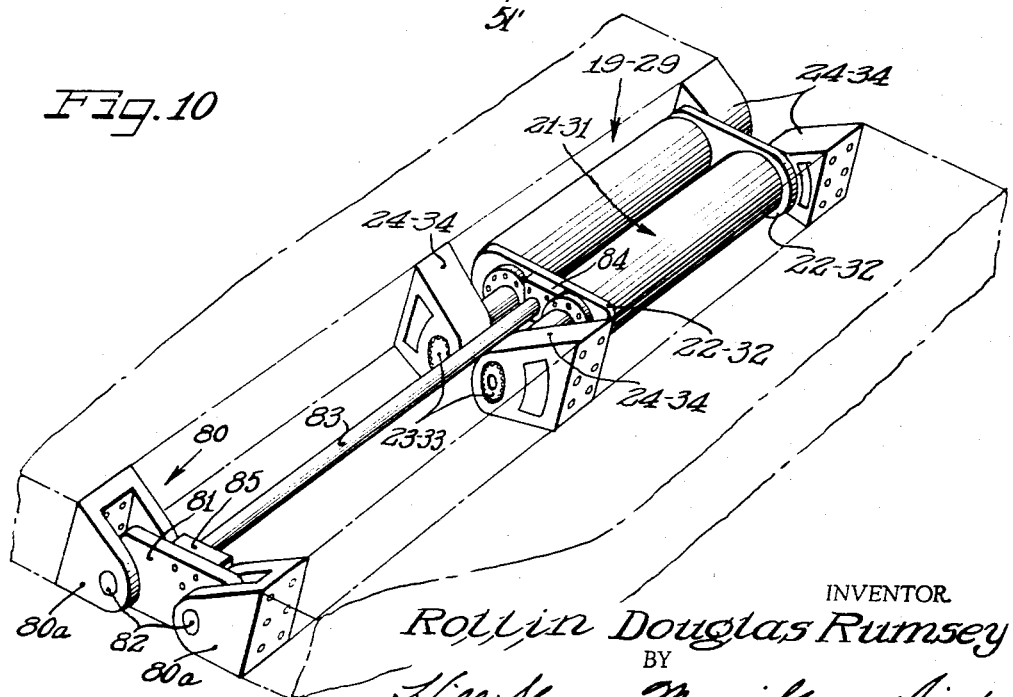
INVENTOR.
Rollin Douglas Rumsey
BY
ATTORNEYS

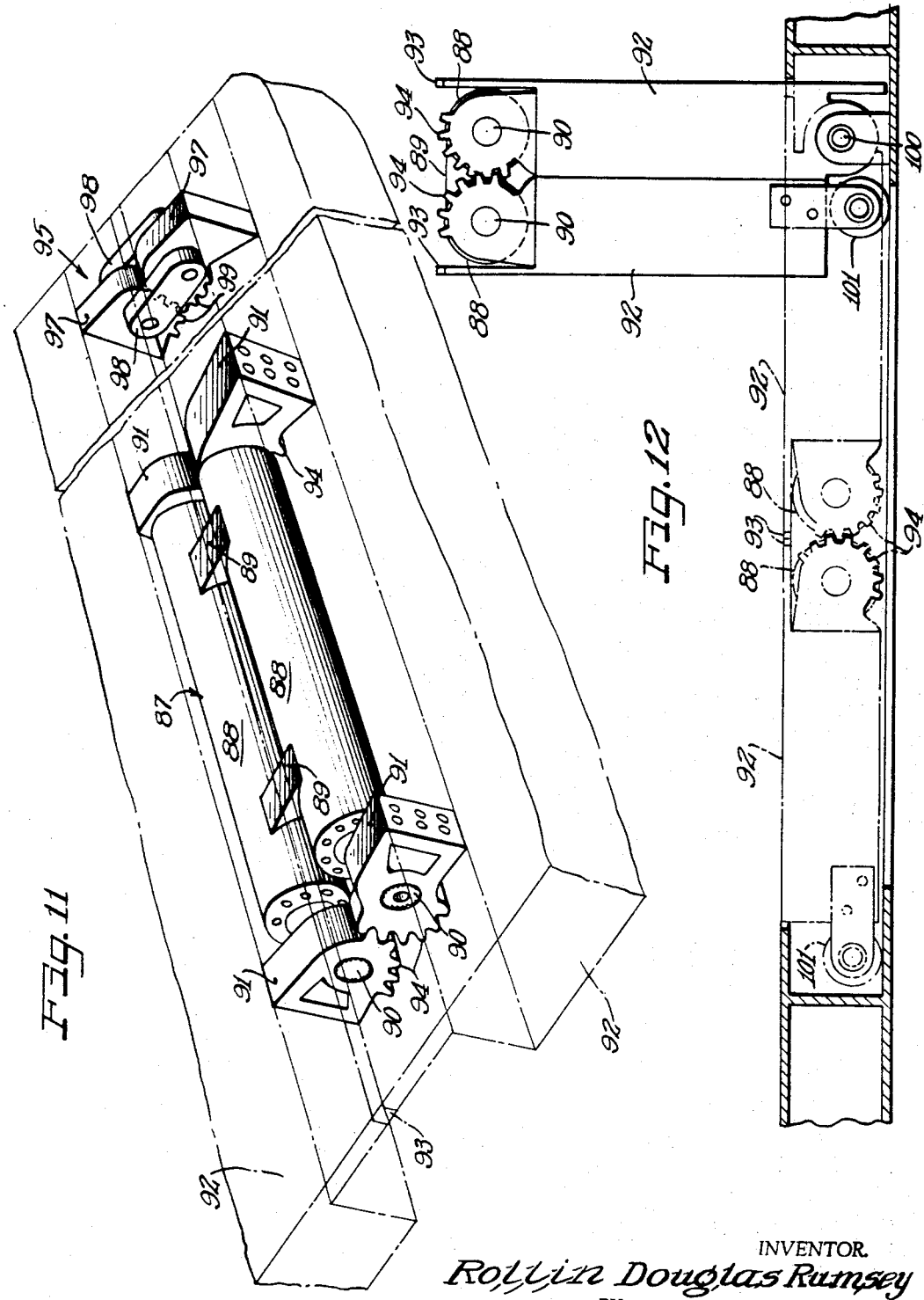

United States Patent Office 3,417,806
Patented Dec. 24, 1968

3,417,806
ROTARY ACTUATOR ASSEMBLIES FOR
RESTRICTED DIAMETER USES
Rollin Douglas Rumsey, Buffalo, N.Y., assignor to Houdaille Industries, Inc., Buffalo, N.Y., a corporation of Michigan
Filed July 10, 1963, Ser. No. 293,997
22 Claims. (Cl. 160—188)

ABSTRACT OF THE DISCLOSURE

Members of an assembly comprising a hatch cover, door and the like are hingably relatively movable by rotary actuators which have either their housings rigidly connected together and rotary shafts projecting from the housings and fixedly connected to the members, or the housings attached to the members and the shafts rigidly connected together. Thereby rotary vane actuators each of which effects 90° rotation cooperate to afford 180° hinging movement. Means may be provided (segmental gears) to assure movement of the cover panels simultaneously and at the same rate of speed.

---

Various situations in which rotary hydraulic actuators are a desirable motor or power source impose rather severe restrictions as to maximum diameter but not necessarily on length. Typical of such situations are motivating hinges for doors and hatch covers, as well as various agricultural and construction machinery situations as for opening and closing buckets or dippers, dredges, bulldozers, and the like. The problem of utilizing hydraulic rotary actuators is further complicated where the hinged member must be rotated 180° such as where a hatch cover or a vertical door must be or desirably should be moved from a closing position into an open position lying flush upon a floor or deck or flush against a vertical wall or hull side, or the like.

While single vane hydraulic rotary actuators are capable of at least 180° serviceable rotation, in small diameter relative to length many design problems occur because of the unbalanced hydraulic construction. The bearing loads become excessive, resulting in extreme friction and loss of actuator efficiency. In addition, and of even greater concern, is the fact that the shaft bends on its longitudinal axis which results in binding in the bearings and causes excessive gaps between the shaft and the housing seals.

Double vane rotary actuators are, by their very construction, limited to approximately 150° maximum travel because of the space taken up by the vanes in the stator and on the shaft. An advantage of the two vane actuators, is that being hydraulically balanced they may be made of any length.

A principal object of the present invention is to provide a new and improved rotary actuator assembly especially adapted for situations where the available diameter clearance is restricted, but where there is relatively no restriction as to length of rotary hydraulic actuator that may be utilized. This object is attained by employing small diameter substantially elongated rotary actuators functioning in a substantially tandem or in series relationship, connected to operate in an in-line or parallel side-by-side disposition.

Another object of the invention is to provide a new and improved rotary actuator hinge construction for heavy duty uses.

A further object of the invention is to provide a new and improved hinge-type actuator construction enabling a door and the like to be swung through a full 180° range.

Still another object of the invention is to provide new and improved dual hydraulic actuators with novel coordinating means.

Yet another object of the invention is to provide new and improved means for synchronizing a rotary actuator hinge assembly with idler hinge means companion thereto along the hinge edges of the members to be relatively hingedly actuated.

A still further object of the invention is to provide in a hydraulic actuator assembly a new and improved speed control system and more particularly a hydraulic valving circuit to control operational speed, eliminate slamming, and prevent excessive pressures from being generated in the actuator assembly.

An additional object of the invention is to provide novel means for avoiding fluid leakage from a dual rotary actuator assembly.

It is also an object of the invention to provide novel means for protecting the shaft connections and the area between the shaft and housing outside of the hydraulic fluid seal of a rotary hydraulic actuator against corrosion or entrance of deleterious foreign matter.

Other objects, features and advantages of the present invention will be readily apparent from the following detailed description of certain preferred embodiments thereof, taken in conjunction with the accompanying drawings, in which:

FIGURE 1 is a fragmental sectional elevational schematic view showing an adaptation of the invention to a hatch or like cover hinge construction;

FIGURE 2 is a similar view showing the cover open;

FIGURE 3 is a similar view showing a modification embodying an intermediately hinged cover or other closure;

FIGURE 4 is a similar view showing still another modification;

FIGURE 5 is an end elevational view of a dual actuator hinge assembly;

FIGURE 6 is a fragmental longitudinal sectional elevational detail view taken substantially on the line VI—VI of FIGURE 5;

FIGURE 7 is a schematic view showing hydraulic control circuitry employed in the actuators of FIGURES 5 and 6;

FIGURE 8 is a schematic view depicting the hydraulic circuitry employed in a single vane actuator embodiment of the invention;

FIGURE 9 is a fragmentary sectional detail view disclosing a practical embodiment of the hydraulic circuitry of either of FIGURES 7 or 8 in an actuator-mounted arrangement as in FIGURE 4;

FIGURE 10 is a more or less schematic perspective view of a powered hinge assembly according to the invention adapted for unusually long hinge requirements;

FIGURE 11 is a more or less schematic perspective view of a powered hinge assembly embodying means for coordinating the rotation of two coupled rotary actuators; and FIGURE 12 is a schematic view disclosing one illustrative useful application of the hinge assembly of FIGURE 11.

In the illustrative embodiment of the invention shown in FIGURES 1 and 2, a closure member or door or cover 15 for closing an opening 17 in a deck, or wall or bulkhead 18 is mounted to be opened and closed by powered means comprising a dual actuator hinge assembly 19. A gasket 20 provides a watertight seal between the closed door or cover 15 and the deck or wall 18. The arrangement shown is especially suitable for hatch covers on cargo vessels.

In order to enable the cover or door 15 to be flush with the deck or wall 18 in the closed position and yet to be swung completely open through 180° to lie in an out-of-the-way position flush or flat against the deck or wall or side 18, the motor or powered hinge assembly 19 comprises two rotary vane hydraulic actuators 21 secured rigidly together in side-by-side parallel relation as by means of one or more connecting members or plates 22. Wing shafts 23 of the actuators are fixedly attached to respective brackets 24 secured to the adjacent edge structure of the closure member 15 at one side of the hinge unit and to the adjacent opposed side edge structure of the deck or wall 18. By having each of the actuators 21 operable to function through a full 90° in the same angular direction for opening and in the opposite angular direction for closing of the closure 15, the full range of 180° is attained. As a result of this construction and relationship, a minimum thickness in the closure member 15 is practicable, since by having two slim diameter actuators in the hinge assembly 19, the hinge assembly is accommodated to the narrow or shallow available space in the hinge area. By having the closure cover 15 lying flush on the deck in the open position, likelihood of damage is greatly minimized and it will offer minimum interference with equipment, and afford more available room or clearance thereover or thereby, as for example head room where it is a cargo hatch cover, and avoid interference with the dock area when used as a door in a vessel side moored alongside the dock. Furthermore, this arrangement enables the use of larger doors or covers than has been considered practicable for prior constructions.

For situations in which extra large openings are desirably closed by foldable, accordion hinged closure members or panels, the arrangement exemplified in FIGURE 3 may be utilized. In this construction, a plurality of closure members 25 for closing an opening 27 such as a hatchway in a deck or bulkhead or ship side 28 is hingedly connected by a power or motor hinge assembly 29, with gaskets 30 sealing the joint between the closure members in the closed position thereof. Small diameter rotary actuators 31 are secured rigidly in side-by-side parallel relation by connecting means 32 and have respective wing shafts 33 fixedly secured to brackets 34 which are mounted on the respective opposed edge structures of the closure panel members 35. The construction and relationship is such that when the actuators 31 are activated they operate through a full 90° each in the same angular direction whereby to fold the closure members 25 from a substantially flush relationship with the outer or upper face of the deck or wall 28 into a face-to-face folded relationship as shown in dot-dash outline, the endmost of the series of closure panel members being hinged as at 35 to the structure 28, and the remaining closure panel or panels having anti-friction roller means 37 engageable with the rim about the opening 27.

Instead of the rotary actuator stators or housings being connected together as a unit and the wing shafts being attached to the relatively movable members of the closure member and deck or wall structures, the actuator housings may be mounted fixedly on the respective edge structures of the closure member and deck or wall member, or on the opposed adjacent edges of foldable closure members. Such an arrangement is shown in FIGURE 4 demonstrating the mounted actuator housing and connected wing shaft arrangement in a construction similar to that of FIGURE 3, primed reference numerals being applied to show the similarity of structure, but it will be understood that this same hinge 29' arrangement may be employed in a construction as in FIGURES 1 and 2 where the powered hinge is the direct hinge connection between the closure member and the deck or wall with which associated. In the illustrated arrangement of FIGURE 4, the actuator housings 31' are fixedly secured to the opposed adjacent edges of the closure members 25' and the connecting means 32' rigidly connects the wing shafts 33' of the actuators.

In any of the representative arrangements described, the actuators may be controlled to function in sequence or simultaneously, one actuator may be longer than the other, or of somewhat difference in size, as desired or as deemed advisable for accommodating various design or functional requirements or preferences.

By way of more detailed disclosure, there has been depicted in FIGURES 5 and 6 one practical construction of a tandem or dual rotary hydraulic actuator hinge unit assembly, identified as 19–29 to indicate the relationship to the illustrative embodiments of FIGURES 1 and 3. The hinge unit includes the elongated relatively small diameter actuator housing or stator units 21–31 rigidly connected in side-by-side parallel relation by the connecting plate members 22–32, while the wing shafts 23–33 are fixedly secured to the mounting brackets 24–34. It will be observed that the actuator housings are secured together at both opposite ends and the wing shafts have opposite end portions which project to the same extent beyond the opposite ends of the housing in each instance.

Each of the actuators of the unit 19–29 is of the dual vane type wherein the housing 21–31 comprises a cylindrical casing 38 defining a working chamber subdivided by opposite fixed abutments 39 into subchambers within which opposite vanes 40 of the wing shaft 23–33 operate (FIGS. 6 and 7). End closures 41 are secured as by means of screws 42 to each end of the body casing 38. The screws also serve as shear pin connectors for the connecting plate members 22–32, as shown in FIGURE 6, by having the plate members clamped between flange portions of the end closures and the respective ends of the tubular body 38.

Since one of the problems on ocean-going ships and the like is corrosion due to sea water, means are provided for effectively protecting the joints of the assembly against entry of the water or other contaminating material. To this end, the end closure or cap members 41 have an annular outward flange extension 43 which has a tapered tip projecting into a flaring annular mouth 44 of the adjacent end of the bracket 24–34 into which the extremity portion of the wing shaft 23–33 projects and is keyed as by means of splines 45. About the wing shaft within the flange 43 and the flaring mouth 44 is provided an annular grease chamber 47. This grease chamber is closed from the outside at the joint between the end of the flange 43 and the mouth 44 by a grease seal 48. Another grease seal 49 is mounted at the outer end of the assembly to protect the spline joint between the shaft and the mounting bracket. Unintended endwise displacement of the wing shaft relative to the brackets 24–34 is avoided by set screws 50.

An important advantage of the general arrangement disclosed utilizing rotary actuators resides in that rotary joints and flexible hoses are avoided in the hydraulic lines which feed the actuators, but solid hydraulic lines may be connected directly into the ends of the stationarily mounted shaft of one of the actuators and crossported through the housings of the companion actuators. To this end, the wing shaft 23–33 of one of the actuators 19–29 is adapted to have a hydraulic source/exhaust line conduit 51 (FIG. 7) connected to the outer end of a counterbore 52 extending axially there into from one end (FIG. 6). At the opposite end of the same wing shaft is a hydraulic source/exhaust fluid communication line or duct 53 connected with the outer end of an elongated counterbore 54. These shaft end counterbores 52 and 54 communicate suitably with the subchambers of the actuator working chamber through cross bores or ports 55 and 57, respectively, transversely through the wing shaft. In this instance, the inner end portion of the hydraulic fluid bore 52 communicates with the cross port or passage 55 through a valve 58 mounted in the intersection of the bores and desirably of the adjustable orifice type although it could under other circumstances be of the needle type. This arrangement is especially suitable for hydraulic fluid introduced into the actuators to effect opening or swinging movement of the door or other pivotally mounted member relative to the structure on which mounted such as a deck, wall or other structure. Thereby pressure fluid is introduced into the two divisions of the subchambers to which the cross bore 55 is ported. At the same time, hydraulic fluid in the remaining two subdivisions of the working chamber to which the cross bore 57 is ported are pressure-relieved or exhausted through this cross bore to and through the axial end bore 54, by way of an eccentrically disposed generally axially extending passage bore 59, an adjustable check valve 60 and a port 61.

To drive the actuators in the opposite direction, that is to close the associated door or swing some other associated hinged member in a return direction, pressure is introduced through the bore 54, which closes the check valve 60 and opens a control valve 62 mounted in a port 63 leading to the bore 59 beyond the check valve 60, thereby pressurizing the working subchambers to which the cross bore 57 leads. At the same time, such pressure bleeding off through a communicating cross bore or passage 64 drives a piston valve 65 from the bottom of blind end bore 66 into closing relation to the valve 58, whereby the hydraulic fluid from the working subchambers to which the cross bore 55 leads is compelled to drain off through an axial bore 67 leading from the cross bore 55, and past an adjustable check valve 68 and by way of a lateral port 69 into the bore 52 which is now on the low pressure or drain-off side of the system. The schematic relationship of the several passages, bores and valves is shown in FIGURE 7.

This arrangement is quite advantageous where heavy weights are to be swung, especially from and to and through a vertical plane from a horizontal plane, such as in hatch covers, and the like, where a large torque variations takes place from zero as in a vertical position to maximum in or adjacent to the horizontal position. Such loads when controlled only by fixed orifice speed control valves have a tendency to slam into the position nearest the maximum torque such as when moving from a vertical position into a horizontal position. When proceeding from vertical to horizontal, if a fixed upstream pressure is applied, the pressure in the restraining actuator chambers frequently becomes excessive because it is the sum of the supply pressure and the pressure generated by the weight. For example, if 2500 p.s.i. is required to raise the weight in a 3000 p.s.i. system, on the downstroke the actuator chamber pressure would be 5500 p.s.i. When a snubbing valve is added to the system, this pressure could go much higher. An additional very important feature of the invention is therefore apparent in the instant control circuit which is capable of minimizing this pressure build up and at the same time providing constant actuation velocity in spite of variable load.

Although the description of the pertinent hydraulic circuitry and controls to accomplish the intended purposes has been in respect to only one of the hydraulic actuators, as in FIGURES 6 and 7, it will be understood that the same results are attained in the hydraulic actuator paired up with the actuator that has the circuitry and valving in the wing shaft thereof. This is effected by crossporting through the housings of the paired actuators by means of respective conduits or ducts 70 and 71 (FIGS. 5 and 6), in this instance communicating through ports in the respective end closures 41 of the actuator but may, if preferred, be ported directly through the body cylinders 38. One of the conduits 70 and 71 interconnects corresponding working subchambers of the actuators cross-passaged through the respective wing shafts, while the other of these conduits connects the remaining cross-passaged sets of working subchambers. Thereby, both of the actuators are driven by the same hydraulic fluid source and system acting through but one of the actuators.

In order to prevent hydraulic fluid leakage from within the actuators under the considerable hydraulic pressures generated in operation, an improved system of seals and pressure relief means are provided. To this end, each of the actuators has an annular high pressure seal 72 between the inner face of each of the end closure cap members 41 and the wing shaft and providing a primary barrier against leakage of hydraulic fluid from the working chamber area within the actuator outwardly past the wing shaft (FIG. 6). Then, a secondary, pressure relieved anti-leakage barrier is provided between the opposed cylindrical surfaces of the wing shaft and the closure member 41 in each instance outwardly beyond but adjacent to the high pressure seal 72, and comprising, in each instance, an axially spaced pair of annular seals 73 having an annular fluid collecting groove 74 therebetween. Conveniently the seals 73 and the groove 74 are provided in the cylindrical surface of the closure member 41.

Leakage into the area between the secondary seals 73 is drained into the lower pressure or bleed-off side or end of the hydraulic operating system. For this purpose the actuator 21-31 carrying the hydraulic circuitry and valving in its wing shaft 23-33 has a check valved port 75 communicating with each of the collecting grooves 74 and the respective ports 61 and 69 leading into the supply line passage bores 54 and 52, respectively. Through this arrangement, the respective check valve in the communicating port 75 closes against actuator motivating hydraulic pressure but opens and permits drainage in the low pressure or bleed-off condition. Thus, the check valve vane system always selects the lower pressure.

In order to equalize drain-off from each end of each of the actuator secondary leakage seals, a system of connecting conduits is provided including a longitudinally extending conduit 77 having branches 78 at its opposite ends ported through the end closure members 41 to communicate with the drain-off or collecting grooves 74. Thereby, all of the collecting grooves 74 are at all times connected to the lowest pressure or drain-off line of the hydraulic operating system.

Overtravel of the actuators is avoided and thereby internal damage prevented, by suitable stop means, herein comprising mechanical limit stops 79 rigidly carried by the mounting brackets 24-34 (FIGS. 5 and 6), and opposing limit stop members rigidly carried by the end closure members 41. Through this arrangement, each of the actuators is limited to 90° travel, for a total of 180° travel of the unit 19-29 in an opening direction.

For some purposes one or more single vane actuators having 180° capability may desirably be employed. Such an actuator and hydraulic control circuitry minimizing pressure build up while at the same time providing constant actuation velocity in spite of variable load is depicted in FIGURES 8 and 9. Basically, the hydraulic circuit comprises duplicating the control valves 58 and 65 in both of the supply lines to the actuator since the actuator will be subject to the additional pressure generated by weight at each end of the oscillating actuating strokes involving the actuated member W exemplified in FIGURE 8. Where the wing shaft of the actuator is to be mounted in fixed relation to the associated structure by means such as the brackets 24-34 of FIGURES 1-3, the wing shaft passages and valve mounting as disclosed in connection with FIGURE 6, but with the valve arrangement 58-65 in both ends of the wing shaft, will afford the pneumatic circuitry and valving schematically depicted in FIGURE 8. However, where the actuator body is mounted fixedly in respect to the associated structure as described in connection with FIGURE 4 so that the wing shaft of the stationarily or fixedly mounted actuator is driven to rotate relative thereto, the arrangement is desirably as depicted in FIGURE 9 wherein the actuator 31' has the wing shaft 33' maintained in coaxial rotary relation to the actuator housing tube 38' by the end cap 41' which has the various passages, porting and valving therein. In this instance the wing shaft has its opposite end portions provided with the key fluting 45' by which such end portions are attached to the rigidly connecting bar 32'.

Fluid supply for the actuator 31' is introduced through a radial bore passage 52' and passes by way of an axial passage 55' into one of the subchambers into which the working chamber of the actuator is subdivided by the abutment 39' (FIG. 8) and the wing shaft vane 40'. Pressure fluid passes through a valve 58' at the intersection of the passages or bores 52'–55' when driving in one rotary direction. When driving in the opposite rotary direction, wherein pressure is introduced through a supply-exhaust passage 54', oriented similarly as the passage 52' in the opposite end cap of the actuator, pressure fluid bleeds through a passage 64' into the area behind a piston valve 65' which thereby closes the supply passage through the valve 58' and forces exhaust passage of hydraulic fluid through the passage port 55' to by-pass the valve 58' and pass through a port 67' to unseat a check valve 68' and escape through the by-pass duct or passage 69' into the entrance passage 52'. Since the valve 68', similarly as the valve 68 in FIGURES 6 and 7 is adjusted for a predetermined throttle flow condition, a fixed differential is maintained across the actuator in operation. This adjusted, fixed differential is in the single vane actuator effected at each of the opposite ends in similar fashion for opposite directions of rotary actuation, as indicated in FIGURE 8, there being a similar supply-exhaust port and passage and valve arrangement, wherein the valves are identified as 58", 65" and 68" at the opposite end of the actuator and corresponding to the same arrangement of passages and valves as identified by the primed reference numerals in FIGURE 9.

The same general arrangement of passages and valves as depicted in FIGURE 9 is adaptable for the double vane type of actuator, where the actuator body is held fixedly and the wing shaft rotated in operation, except that the circuitry depicted in FIGURE 7 will be employed.

When a dual actuator assembly 19–29 is used in an extremely long hinge joint, there is the possibility of warpage developing, even though additional link hinge means may be employed. A solution for this problem is depicted in FIGURE 10 wherein an actuator assembly 19–29 comprising parallel elongated rotary actuators 21–31 having the bodies connected by the rigid link bars 22–32 and having the wing shafts 23–33 keyed to the respective mounting brackets 24–34, is mounted adjacent to one end of the hinge joint. Adjacent to the opposite end of the hinge joint, or at least spaced a substantial distance axially from the actuator hinge assembly 19–29 is a hinge link assembly 80 comprising mounting brackets 80a attached to the opposing edges of the members defining the hinge joint and connected by a link bar or plate 81 through the medium of hinge pins 82.

In order to maintain the actuator hinge assembly 19–29 and the link assembly 80 positively in line and free from binding, a tie rod connection is provided comprising a torque rod or tube element 83 fixedly secured at one end through an attachment block or plate 84 to the adjacent end connecting link bar 22–32 of the actuator hinge assembly 19–29 and at its opposite end through a connecting block or plate 85 to the hinge link 81. This thoroughly stabilizes the long hinge joint.

Where an actuator hinge assembly 29' of the actuator mounted, wing shaft connected type is employed in the arrangement of FIGURE 10, the torque element 83 will be secured to the adjacent connecting link plate bar 32' of the actuator assembly to attain the same desirable results.

When using a pair of rotary actuators located side-by-side in a powered hinge assembly such as for opening and closing ship's hatch covers it has been found that the actuator with the lower friction or lower torque moves first, followed by the companion actuator, frequently after the first actuator has reached the extremity of its travel. Under some situations this random operation is of no consequence. However, in other situations, as on a weather deck hatch cover, it has been found if one actuator has reached its extreme of travel before the other, just as the hatch reaches its fully closed position, one cover may seat before the other, resulting in a relative vertical motion of one cover to the other, which causes scuffing of the weather seal with liability of ensuing leakage. Sometimes, also there is skewing where the friction on one end of the cover is greater than the other, resulting in alternate motions of the two ends of the cover or "walking out" of the cover as it closes with often excessive shock loads and undesirable concentration of stress levels in certain parts of the actuators. Such a condition is particularly prevalent where the hatches or doors are extremely long in proportion to their width. Accordingly, to overcome these problems, means are provided for co-ordinating the rotation of two coupled actuators so that they each turn at a uniform rate, an example of such means being depicted in FIGURES 11 and 12, embodying a hydraulic powered hinge assembly 87 including a pair of elongated slim rotary actuators 88 having the bodies thereof secured fixedly together in parallel relation as by means of weld ties 89 or, if preferred, cast as a unit. The opposite end portions of respective rotary wing shafts 90 of the actuators are keyed to mounting bracket blocks 91 which are secured fixedly to opposing edges defining a hinge joint between hingedly connected door or cover members 92 including a weather seal 93 on the opposed edges of the hinge joint overlying flanges of the members 92. Actuation of the actuators 88 is adapted to be effective similarly as described for the actuators 21–31.

Means for co-ordinating rotation of the two coupled actuators 88 comprise respective meshing complementary gear teeth 94 on the mounting brackets 91, comprising segmental gear portions on the brackets. Thereby, the mounting brackets 91 serve substantially as geared levers to synchronize action of the two actuators.

On hatch covers, for example, where extreme widths of hatch requires an additional hinge point, a hinge assembly 95 may be used spaced beyond one end of the actuator assembly 87. This hinge assembly 95 comprises fixed lever bracket hinge members 97 attached to the opposing hinge edges of the members 92 and connected by pivotally attached links 98. Synchronization of the hinge 95 with the actuator assembly 87 is accomplished by providing the hinge members 97 with complementary, meshing, segmental gear teeth portions 99 corresponding to the segmental gear portions 94 of the actuator assembly.

Through the arrangement of FIGURES 11 and 12, both portions 92 of a hatch cover assembly will as shown in FIGURE 12, reach an open position simultaneously on the hinge 100 of one of the cover members and the anti-friction rollers 101 of the other of the cover members. In closing the hatch cover, both of the members 92 will reach the closed position simultaneously. Scuffing of the weather seal 93 as well as warping of the cover members 92 is effectively overcome.

It will be understood that modifications and variations may be effected without departing from the scope of the novel concepts of the present invention.

I claim as my invention:

1. An assembly comprising relatively hingedly movable members defining therebetween a hinge joint of substantial length,
   rotary actuator hinge means connecting the members in the hinge joint and operable to relatively hingedly actuate the members,
   additional hinge means connecting the hinge joint spaced from the actuator hinge means, and means for substantially synchronizing the actuator hinge means and said additional hinge means.

2. An assembly as defined in claim 1, wherein said synchronizing means comprises a torque element extending longitudinally in the hinge joint and fixedly secured at its opposite ends to respectively the actuator hinge means and the additional hinge means.

3. An assembly as defined in claim 1, wherein said synchronizing means comprises gear structure in the actuator hinge means and in said additional hinge means.

4. A hatch cover assembly for a hatchway comprising,
a pair of panels adapted to extend over said hatchway in side-by-side relationship in closed position and in folded booked relationship in open position,
and actuating means connecting adjacent portions of said panels for effecting pivotal movement of said panels respectively about spaced parallel axes fixed relative to each other,
said actuating means comprising a pair of separate rotary actuators for moving the panels about their respective pivotal axes, said axes remaining in said fixed, spaced parallel relation with respect to each other in all panel positions,
said actuating means being located within the confines of said panels at least in one of the positions thereof.

5. A hatch cover assembly for a hatchway comprising a pair of panels adapted to extend over said hatchway in side by side relationship in closed position and in folded book relationship in open position,
actuating means connecting adjacent portions of said panels for effecting pivotal movement of said panels respectively about spaced parallel axes fixed relative to each other,
said actuating means comprising a pair of actuators each having a rotary member defining one of said spaced parallel axes,
each of said rotary members being directly connected to an associated panel to provide the connection between the actuating means and said panel,
complementary gear means fixed relative to said rotary members respectively and directly engaging each other,
whereby when said panels are moved about their respective pivotal axes they will move simultaneously and at the same rate of speed.

6. A hatch cover assembly for a hatchway comprising a pair of hatch cover panels adapted to extend over said hatchway, said panels adapted to lie in side by side substantially horizontal relation in the closed position and standing in folded generally parallel substantially vertical relation in the open position,
actuating means connected to adjacent portions of said panels for effecting pivotal movement thereof about spaced parallel axes respectively between said closed and open positions,
said actuating means comprising a pair of hydraulic rotary actuators forming an integral unit,
said respective actuators having individual rotors with spaced parallel axes fixed relative to each other and coaxial with the pivotal axes of said panels,
means connecting one of said rotors to its adjacent associated panels,
means connecting the other of said rotors to its adjacent associated panels,
complementary gear means secured respectively to said rotors and directly engaging each other to provide simultaneous movement of said panels at the same rate of speed.

7. A hatch cover assembly as set forth in claim 6 wherein each of said panels comprises a rectangular top plate, said top plates lying in side by side relation across the hatchway in substantially a horizontal plane in closed position, said actuating means being located below the top plates in the closed position of the hatch covers and positioned to rotate the covers between closed and open positions, said actuator axes being spaced from each other a sufficient distance so that in the open hatch cover position the actuating means is located completely within the confines of said panels.

8. A hatch cover assembly as set forth in claim 7 in which said actuating means are located substantially within the confines of the panels in closed position.

9. A hatch cover assembly for a hatchway in the deck of a ship comprising a pair of panels adapted to extend over said hatchway, said panels lying in side by side relation in substantially a horizontal plane when in closed position,
means pivotally mounting a side of one of said panels with respect to the deck of the ship, hydraulic actuating means connecting adjacent sides of said panels for effecting folding movement thereof between closed and open positions,
a roller at each end adjacent the opposite side of the other panel,
a track positioned on each side of the hatchway on which said rollers ride to guide the opposite side of said other panel,
said actuating means comprising an integral unit having a pair of spaced parallel rotors,
gear means fixed to each of said rotors,
said gear means directly engaging each other and means connecting each of said rotors to its associated adjacent panel.

10. A hatch cover assembly for a hatchway comprising first and second hatch cover panels adapted to extend over said hatchway, said panels adapted to lie in side by side relationship in the closed position and standing in folded generally parallel relationship in the open position,
actuating means connected to adjacent portions of said first and second panels for effecting pivotal movement of said panels about respective axes, said axes being spaced, parallel and fixed relative to each other,
said actuating means comprising first and second hydraulic rotary actuators adjacent said first and second panels respectively, each of said actuators having a casing member and a rotor member, means connecting one of the members of said first actuator to said first panel,
means connecting one of the members of said second actuator to said second panel,
complementary gear means secured to each of said connected members respectively and directly engaging each other, and
means connecting the other of said members of the respective actuators to each other.

11. A hatch cover assembly for a hatchway comprising a pair of hatch cover panels adapted to extend over said hatchway, said panels adapted to lie in side by side substantially horizontal relation in the closed position and standing in folded generally parallel substantially vertical relation in the open position, actuating means connected to adjacent portions of said panels for effecting pivotal movement thereof about spaced parallel axes respectively between said closed and open positions, said actuating means comprising a pair of hydraulic rotary actuators forming an integral unit, said respective actuators having individual rotors with spaced parallel axes fixed relative to each other and coaxial with the pivotal axes of said panels, means connecting one of said rotors to its adjacent associated panel, said axes remaining in said fixed, spaced parallel relation with respect to each other in all panel positions, means connecting the other of said rotors to its adjacent associated panel, and means adapted to connect said actuating means to fluid under pressure for effecting movement of said panels.

12. A hatch cover assembly as set forth in claim 11, wherein each of said panels comprises a rectangular top plate, said top plates lying in side by side relation across the hatchway in substantially a horizontal plane in closed position, said actuating means being located below the top panels in the closed position of the hatch covers and positioned to rotate the covers between closed and open positions, said actuator axes being spaced from each other a sufficient distance so that in the open hatch cover position the actuating means is located completely within the confines of said panels.

13. A hatch cover assembly as set forth in claim 11, wherein each of said actuators comprises a casing having a cylindrical chamber therein, a rotor having a circular cross section being journally supported by opposite ends of said casing, each of said rotors having an end portion outside opposite ends of its casing, bracket means connecting the rotor end portions of the respective actuators with the respective panels to key the associated rotors and panels together against relative rotational movement with respect to each other, said rotor being concentric with said cylindrical chamber and having generally axially directed outwardly extending vane means within said casing and in sealing engagement with the walls of said chamber, axially extending divider means integral with said casing and extending inwardly into sealing engagement with said rotor, said rotor, vane means and divider means forming working compartments within said chamber, and means for connecting alternate compartments to fluid under pressure and to exhaust respectively for effecting movement of said panels.

14. A hatch cover assembly as set forth in claim 11, wherein one of said panels has means adjacent its outer edge adapted to pivot said one panel about a fixed axis, said other panel having means associated with its outer edge adapted to movably support said panel on opposite sides of the hatchway, said actuating means being positioned a sufficient distance from the hatchway to be at least within the plane formed by said fixed pivot means and said support means in the closed position of the hatch covers, whereby initial opening movement of the outer edge of said other panel from the closed position will be toward the fixed axis.

15. A hatch cover assembly for a hatchway comprising first and second hatch cover panels adapted to extend over said hatchway, said panels adapted to lie in side by side relationship in the closed position and standing in folded generally parallel relationship in the open position, actuating means connected to adjacent portions of said first and second panels for effecting pivotal movement of said panels about respective axes, said axes being spaced, parallel and fixed relative to each other, said axes remaining in said fixed, spaced parallel relation with respect to each other in all panel positions, said actuating means comprising first and second hydraulic rotary actuators adjacent said first and second panels respectively, each of said first and second actuators having a casing and a rotor, said rotors being coaxial respectively with said pivotal axes, means connecting one of said first actuator casing and rotor to said first panel, means connecting one of said second actuator casing and rotor to said second panel, and means connecting the other of the respective actuator casings and rotors with each other.

16. A hatch cover assembly for a hatchway comprising a pair of panels adapted to extend over said hatchway in side by side relationship in closed position and in folded booked relationship in open position, actuating means connecting adjacent portions of said panels for effecting pivotal movement thereof about spaced parallel axes fixed relative to each other, said actuating means comprising a pair of actuators each having a rotary member defining one of said spaced parallel axes, said axes remaining in said fixed, spaced parallel relation with respect to each other in all panel positions, each of said rotary members being directly connected to an associated panel to provide the connection between the actuating means for said panel.

17. An assembly including members relatively movable about a hinge joint:
powered hinge means for hingedly relatively moving said members and comprising a pair of rotary hydraulic actuators having bodies rigidly attached together and with rotary shafts projecting from the attached bodies;
means fixedly connecting said shafts respectively to said members;
and means for driving the actuators.

18. An assembly including members relatively movable about a hinge joint, comprising:
powered hinge means for hingedly relatively moving said members and comprising a pair of rotary hydraulic actuators having bodies attached respectively to said members and shafts projecting from said bodies;
means rigidly connecting said shafts together;
and means for driving the actuators.

19. An assembly comprising a hatch cover, door and the like including a pair of members providing therebetween a hinge joint, comprising:
a plurality of rotary actuators hingedly connecting said members in the hinge joint;
means rigidly connecting parts of said actuators together so that in the hinge movements of said members said parts remain constantly in the same relation to each other;
other parts of the actuators being rotatable relative to said connected parts and relative to one another;
and means for driving said actuators for relatively hingedly moving at least one of said members relative to the other of said members.

20. A hatch cover assembly for a hatchway comprising:
a pair of panels adapted to extend over said hatchway in side-by-side relationship in closed position and in folded booked relationship in open position;
and actuating means connecting adjacent portions of said panels for effecting pivotal movement of said panels respectively about spaced parallel axes fixed relative to each other;
said actuating means comprising a pair of separate rotary actuators for moving the panels about their respective pivotal axes, said actuators being rotary hydraulic actuators having bodies rigidly attached together and with rotary shafts projecting from the attached bodies and fixedly connected to said panels respectively, said axes remaining in said fixed, spaced parallel relation with respect to each other in all panel positions;
said actuating means being located within the confines of said panels at least in one of the positions thereof.

21. A hatch cover assembly for a hatchway comprising:
a pair of panels adapted to extend over said hatchway in side-by-side relationship in closed position and in folded booked relationship in open position;
and actuating means connecting adjacent portions of said panels for effecting pivotal movement of said panels respectively about spaced parallel axes fixed relative to each other;
said actuating means comprising a pair of separate rotary actuators for moving the panels about their respective pivotal axes, said actuators comprising rotary hydraulic actuators having bodies attached to said panels respectively and shafts projecting from the bodies and connected rigidly together, said axes remaining in said fixed, spaced parallel relation with respect to each other in all panel positions;
said actuating means being located within the confines of said panels at least in one of the positions thereof.

22. A hatch cover assembly for a hatchway comprising a pair of panels adapted to extend over said hatchway in side by side relationship in closed position and in folded book relationship in open position:
  actuating means connecting adjacent portions of said panels for effecting pivotal movement of said panels respectively about spaced parallel axes fixed relative to each other and at opposite sides of a hinge joint between said adjacent portions of said panels;
  said actuating means comprising a pair of actuators each having a rotary member defining one of said spaced parallel axes;
  each of said rotary members being directly connected to an associated panel to provide the connection between the actuating means and said panel;
  and means attached to said panels and extending across said joint and effective to coordinate rotation of the members;
whereby when said panels are moved about their respective pivotal axes they will move simultaneously and at the same rate of speed.

References Cited

UNITED STATES PATENTS

| | | | |
|---|---|---|---|
| 2,855,038 | 10/1958 | Green | 160—188 |
| 2,930,434 | 3/1960 | Englesson | 160—188 |
| 3,021,822 | 2/1962 | Rumsey | 92—125 |
| 3,179,020 | 4/1965 | Rumsey et al. | 92—125 |
| 3,146,800 | 3/1965 | Isbell | 92—67 |
| 1,111,605 | 9/1914 | Moss et al. | 92—67 X |
| 1,116,974 | 11/1914 | Bergesen | 92—122 X |
| 2,045,140 | 6/1936 | Horton et al. | 92—67 X |
| 3,053,232 | 9/1962 | Self | 92—122 X |
| 3,053,236 | 9/1962 | Self et al. | 92—122 X |
| 3,103,968 | 9/1963 | Aarvold et al. | 160—188 |

PETER M. CAUN, *Primary Examiner.*

U.S. Cl. X.R.

92—67, 122